United States Patent
Shen et al.

(10) Patent No.: US 11,893,015 B2
(45) Date of Patent: Feb. 6, 2024

(54) OPTIMIZING QUERY PERFORMANCE IN VIRTUAL DATABASE

(71) Applicant: INTERNATIONAL BUSINESS MACHINES CORPORATION, Armonk, NY (US)

(72) Inventors: Hai Jun Shen, Tianjin (CN); Chang Sheng Liu, Haidian (CN); Ying Qi Pan, Beijing (CN); Liam Loucks, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/455,532

(22) Filed: Nov. 18, 2021

(65) Prior Publication Data

US 2023/0153302 A1    May 18, 2023

(51) Int. Cl.
*G06F 16/2453*   (2019.01)
*G06F 16/25*     (2019.01)

(52) U.S. Cl.
CPC ...... *G06F 16/24542* (2019.01); *G06F 16/256* (2019.01)

(58) Field of Classification Search
CPC .................. G06F 16/24542; G06F 16/256
See application file for complete search history.

(56) References Cited

U.S. PATENT DOCUMENTS

| | | |
|---|---|---|
| 7,362,707 B2 | 4/2008 | MeLampy et al. |
| 7,831,592 B2 | 11/2010 | Markl et al. |
| 8,543,566 B2 * | 9/2013 | Weissman ........... G06F 16/2462 707/715 |
| 2005/0108199 A1 | 5/2005 | Ellis et al. |
| 2015/0169688 A1 * | 6/2015 | Halverson ......... G06F 16/24542 707/718 |
| 2015/0317359 A1 * | 11/2015 | Tran ....................... G06F 16/23 707/718 |
| 2015/0324432 A1 * | 11/2015 | Gangloor ............ G06F 16/2453 707/718 |

(Continued)

FOREIGN PATENT DOCUMENTS

CN    1367898 A    9/2002

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Dangelino N Gortayo
(74) *Attorney, Agent, or Firm* — Stephanie Carusillo; George Blasiak; Heslin Rothenberg Farley

(57) ABSTRACT

Methods, computer program products, and systems are presented. The methods include, for instance: collecting real time system statistics on a system environment in a remote platform running a remote data source amongst a plurality of remote data sources of a virtual database. Real time data source statistics on one or more data source objects from the remote data source of the virtual database is also gathered. A global catalog of the virtual database is updated with the real time system statistics and the real time data source statistics. An access plan to process a query to the virtual database is optimized based on the real time system statistics and the real time data source statistics and a response is produced based on the access plan, with improved performance and reduced cost.

20 Claims, 7 Drawing Sheets

(56) References Cited

U.S. PATENT DOCUMENTS

2016/0283551 A1 9/2016 Fokoue-Nkoutche et al.
2017/0357692 A1* 12/2017 Su .................... G06F 16/24542
2018/0144004 A1* 5/2018 Bedi .................. G06F 16/9024
2020/0019552 A1* 1/2020 Deng ................ G06F 16/24542
2020/0356563 A1 11/2020 Nawrocke et al.
2021/0209110 A1 7/2021 Kalil et al.

* cited by examiner

OPTIMIZING QUERY PERFORMANCE IN VIRTUAL DATABASE

TECHNICAL FIELD

The present disclosure relates to virtual database performance optimization, and more particularly to methods, computer program products, and systems for optimizing a response time of real time queries based on real time statistics in a virtual database.

BACKGROUND

A virtual database system, also referred to a federated database or a federated system, is a type of distributed database management system offering a unified logical view in accessing and operating numerous constituent database systems without technical details. The constituent database systems approached by the virtual database are individual database management systems of respective types that can be accessed and operated respectively and can be geographically dispersed. The virtual database system coordinates operations of the constituent database systems that are heterogeneous and autonomous without imposing any single data model on the data. In order to achieve the level of data virtualization for a client upon the heterogeneous database systems in respective technical environments, the virtual database uses various techniques for abstraction and transformation based on semantics of queries to attain query performance. The virtual database system and data virtualization is widely used in the areas of technologies including business intelligence, service-oriented architecture data services, cloud computing, in conjunction with various data service models including online transaction processing and online analytical processing, data warehousing.

SUMMARY

The shortcomings of the prior art are overcome, and additional advantages are provided, through the provision, in one aspect, of a method. The method includes, for instance: collecting, by one or more processor, real time system statistics on a system environment in a remote platform running a remote data source amongst a plurality of remote data sources of a virtual database, where the remote data sources of the virtual database are heterogeneous database management systems run on respective remote platforms across disparate geographical locations; gathering, by the one or more processor, real time data source statistics on one or more data source objects from the remote data source of the virtual database; updating, by the one or more processor, a global catalog of the virtual database with the real time system statistics from the collecting and the real time data source statistics from the gathering; optimizing, by the one or more processor, an access plan to process a query submitted to the virtual database from a client application based on the real time system statistics and the real time data source statistics in the global catalog; and producing, by the one or more processor, a response corresponding to the query by executing the access plan to thereby improve both a response time of the query and a cost of processing.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
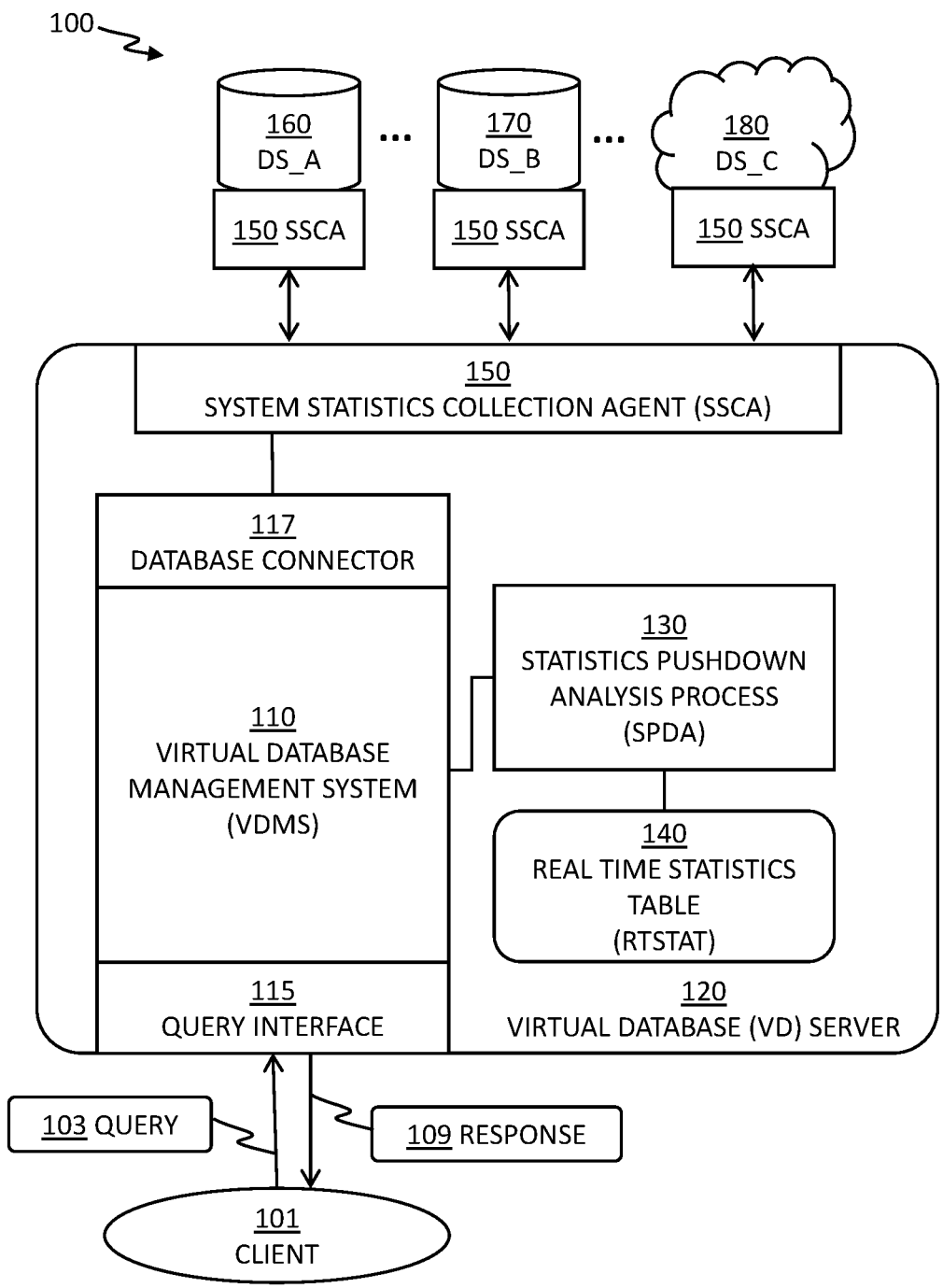
FIG. 1 depicts a virtual database system for optimizing query performance, in accordance with one or more embodiments set forth herein.

FIG. 1 depicts a virtual database system 100 for optimizing query performance, in accordance with one or more embodiments set forth herein.

The virtual database system 100 includes a virtual database server 120 that interacts with a client 101 in servicing requests to the virtual database system 100 indicating a plurality of heterogeneous database systems that operates to be perceived by the client 101 as a single database. The client 101 collectively refers to end users and client applications that submits a query 103 to the virtual database server 120 to get a response 109 corresponding to the query 103 based on content of the virtual database system 100. The client 101 interacts with the virtual database server 120 via a query interface 115 in the virtual database server 120, often in a specific query language such as Structured Query Language (SQL).

Individual database systems of the virtual database system 100, shown as DS_A 160, DS_B 170, and DS_C 180 are referred to as data sources of the virtual database server 120. Respective data sources DS_A 160, DS_B 170, and DS_C 180 are heterogeneous in types of the databases and distributed in many locations. The data sources DS_A 160, DS_B 170, and DS_C 180 can be geographically local to the virtual database server 120 or remote across digital communication networks, can be on a private cloud or a public cloud, and can be a relational database or a non-relational database. Examples of the data sources DS_A 160, DS_B 170, and DS_C 180 include relational databases such as Oracle, DB2, Microsoft SQL Server, MySQL, PostgreSQL, MS Azure, AWS database, etc., and non-relational databases such as XML data, spreadsheet data, cloud message queue, web services, datacenter-cloud applications by various vendors, etc., running on respective platforms. (Oracle and MySQL are registered trademarks of Oracle and/or its affiliates in the United States and/or other countries; DB2 and db2 are registered trademarks of International Business Machines Corporation in the United States and/or other countries; Microsoft, SQL Server, and Azure are registered trademarks of Microsoft Corporation in the United States and/or other countries; PostgreSQL is a registered trademark of PostgreSQL Community Association of Canada in the United States and/or other countries; and AWS is a registered trademark of Amazon Technologies, Inc., in the United States and/or other countries.) Each of the data sources DS_A 160, DS_B 170, and DS_C 180 coupled to the virtual database server 120 is an individual database management system (DBMS) that participates in the virtual database system 100, and accordingly, the query 103 to the virtual database server 120 can be sent for processing to any of the data sources DS_A 160, DS_B 170, and DS_C 180 based on an access plan devised by the virtual database server 120.

The virtual database server 120 includes a virtual database management system (VDMS) 110 for handling the query 103 and the response 109 and for controlling query processing and coordinating results obtained from the data sources DS_A 160, DS_B 170, and DS_C 180. The VDMS 110 is operatively coupled to the data sources DS_A 160, DS_B 170, and DS_C 180 via a database connector 117.

The database connector 117 is a standard application programming interface (API) for accessing respective DBMSs for the data sources DS_A 160, DS_B 170, and DS_C 180. Examples of the database connector 117 are Open Database Connectivity (ODBC) and/or Java Database Connectivity (JDBC) in combination with various routines referred to as wrappers that implements interactions between the VDMS 110 and the respective DBMSs for the data sources DS_A 160, DS_B 170, and DS_C 180 as a part of a library of the VDMS 110. (Java is a registered trademarks of Oracle and/or its affiliates in the United States and/or other countries.)

The virtual database server 120 communicates with the data sources DS_A 160, DS_B 170, and DS_C 180 via a particular type of communication protocols that enable communication between applications accessing the virtual database server 120 and disparate platforms that respectively run the data sources DS_A 160, DS_B 170, and DS_C 180, and enables relational database to be distributed among multiple platforms such as Distributed Relational Database Architecture™ (DRDA).

As noted above, the virtual database server 120 is a platform to achieve data virtualization that allows the client 101, often applications accessing the virtual database server 120, to retrieve and manipulate data as if the client 101 uses a single database, without concerning any technical details about the data such as table formats or the location and type of the data source. The query interface 115 of the virtual database server 120 provides such a singular view of the virtual database system 100 and the VDMS 110 performs unique functions to support the data virtualization. The singular view of the virtual database system 100 is often referred to as SQL view, as SQL is a commonly used query language for database accesses. Functionalities of the VDMS 110 on the virtual database server 120 are presented in FIG. 2 and corresponding description, in accordance with embodiments of the present invention.

The functionalities supporting the data virtualization can create a lot of overhead and degrade performance in servicing the query 103 if a data transfer of a very large volume of data from one data source to another data source is completed without justification or accessing certain data that do not contribute to processing the query 103. Particularly if the query 103 requires the response 109 in real time, as in financial transactions, any delay with the response 109 would offset benefits of data virtualization for the client 101. In this specification, term "query performance degradation" refers to a combination of delayed responses and higher cost of processing, and terms "optimization", "query performance optimization", "plan optimization" interchangeably refer to a reduction in a response time for the query 103 and/or the cost of processing the query 103.

In order to optimize query performance in the virtual database system 100, the virtual database server 120 includes a statistics pushdown analysis process (SPDA) 130 and a system statistics collection agent (SSCA) 150.

The query performance indicating a response time to service the query 103 in combination with a cost of processing the query 103 would measure how efficiently the virtual database system 100 operates. As noted earlier, the virtual database server 120 devises the access plan to optimize processing of the query 103 in the virtual database system 100 addressing many strategic decisions involving issues of, for example, whether the query 103 would be executed locally or remotely, and how to access data source objects relevant to processing the query 103 across platforms processing the query 103, etc. The data sources DS_A 160, DS_B 170, and DS_C 180, can be local or remote to the virtual database server 120, and as noted above, each of the data sources DS_A 160, DS_B 170, and DS_C 180 includes individual database management system that can process queries. The query 103 may need to retrieve data from two or more distinct data sources for processing, in which case data source objects from one of the data sources should be transferred to another platform regardless of which platform running one of the data sources executes the query 103. Once the query 103 has been processed, the response 109 is to be generated and delivered to the client 101 by the virtual database server 120.

One of the typical factors affecting the access plan in optimizing the query performance is a relative amount of data source objects in remote or local data sources relevant to processing the query 103. The virtual database server 120 would determine a remote or local execution of the query 103 in the access plan to minimize the amount of data source objects to transfer for processing. For example, if there are a million records in a remote data source but a few hundred records in a local data source relevant to processing the query 103, then the virtual database server 120 would devise the access plan to execute the query 103 at the remote database instead of transferring all records from the remote data source to a local platform to process the query 103. Such technique of moving operations of the query 103 to a location of the data source objects in distributed database systems is referred to as a push down, or pushdown, and pushdown analysis is to determine if query operations can be performed at a data source. In terms of query semantics, applying more selective predicates to the query 103 as early as possible is a common technique referred to as a "predicate pushdown", which significantly minimizes the amount of data source objects to process the query 103.

For conventional pushdown analysis based on a volume of the data source objects, conventional virtual database servers use a system procedure to learn remote data source statistics information on data source objects such as server name, schema name, column types, index names, etc., on respective remote data sources. The remote data source statistics is often referred to as "nickname statistics", based on the term "nickname" indicating an identifier of any data source object created in the conventional virtual database servers for access. In conventional virtual database systems, all nicknamed data source objects across all data sources coupled to the conventional virtual database systems are listed for direct check and access in a global catalog. Certain instances of conventional virtual database systems can supply the global catalog with additional metadata information about the nicknamed objects such as values in certain columns of the data source object, which is referred to as nickname column options, to facilitate direct access to a column of a table to streamline the pushdown analysis on the data source objects.

In conventional virtual databases, the nickname statistics primarily concerns description and usages of data source objects and the remote data source statistics are rarely updated on the conventional virtual database servers. In conventional virtual databases, there is no automated feedback loop that can be initiated by a remote platform when a third-party application having insert/update/delete (IUD) operations runs on the remote platform and changes the data source objects, which the conventional virtual databases must control and keep track of Conventional virtual database servers do not have much system environment information on remote platforms that can be used for the access plan, which can be caused by restrictions on parameters offered by database connectors used in the conventional virtual database servers.

To improve query performance in the virtual database system 100 over conventional virtual databases with drawbacks noted above, the virtual database server 120 includes the SPDA 130 and instances of the SSCA 150 respective to the virtual database server 120 and each of the data sources DS_A 160, DS_B 170, and DS_C 180 for collecting real time system statistics across the data sources DS_A 160, DS_B 170, and DS_C 180 and processing the real time system statistics in devising the access plan for the query 103. Further the virtual database system 100 also collects and utilizes real time data source statistics to monitor any change to data source objects by a third-party application that does not participate in the virtual database system 100 running on a remote platform. The virtual database server 120 updates the real time statistics by use of a two-tiered synchronization mechanism such that the real time statistics can contribute to query performance based on a real time statistics update configuration.

The SPDA 130 performs statistics mapping between the virtual database server 120 and each of the data sources DS_A 160, DS_B 170, and DS_C 180 by converting methods and formats to access desired statistics information into respective methods and formats available from each of the data sources DS_A 160, DS_B 170, and DS_C 180 and other functions to facilitate communications between instances of the SSCA 150 on each of the data sources DS_A 160, DS_B 170, and DS_C 180. For example, for a data source running db2 DBMS, the SPDA 130 determines a RUNSTATS command line for desired data source object and communicates with the SSCA 150 running on the db2 platform to execute the RUNSTATS command. Similarly, for another data source running Oracle 19c DBMS, the SPDA 130 determines a job "DBMS_STATS.SET_GLOBAL_PREFS" will collect real time statistics and communicates with the SSCA 150 running on the Oracle platform to execute the job identified. Similarly, for still another data source running MySQL DBMS, the SPDA 130 determines that a query to access INFORMATION_SCHEMA.TABLES for a desired information is necessary and communicates with the SSCA 150 running on the MySQL platform to run the query to retrieve the statistics information. For another data source running SQL Server DBMS, the SPDA 130 determines a procedure "set statistics time" on SQL statement is a proper way to access the desired statistics information and communicates to the SSCA 150 to perform the procedure as noted. For certain remote DBMS that does not provide particular method to fetch real time statistics information, the SPDA 130 queries system information tables, as noted above.

The virtual database server 120 and/or the SPDA 130 stores the real time system statistics of the virtual database server 120 and respective platforms running each of the data sources DS_A 160, DS_B 170, and DS_C 180 and the real time data source statistics for each of the data sources DS_A 160, DS_B 170, and DS_C 180 in a real time statistics table (RTSTAT) 140.

The real time system statistics refers to certain preselected parameters in technical environment for all remote platforms running the data sources DS_A 160, DS_B 170, and DS_C 180 and the virtual database server 120. The real time system statistics includes, but are not limited to, available computing resources, memory spaces, and input/output data speed, on respective platforms running the data sources DS_A 160, DS_B 170, and DS_C 180 as well as respective digital communication network bandwidths, or speeds of data transfer, between the virtual database server 120 and each of the data sources DS_A 160, DS_B 170, and DS_C 180. The real time system statistics would determine how fast the data source objects can be transferred between the virtual database server 120 and any of the data sources DS_A 160, DS_B 170, and DS_C 180 that run on remote platforms from the virtual database server 120, and processing time at the remote platforms if the query 103 is processed at the remote platforms.

The virtual database system 100 improves query performance by providing a range of statistics information including, but not limited to, real time system statistics including network connectivity of the data sources in the virtual database system 100 and processing, memory, and I/O capacity for respective remote platforms running the data sources. The virtual database system 100 provides real time global data source statistics collection amongst heterogeneous remote data sources. The virtual database system 100 provides a method for real time statistics collection that is initiated by a preexisting nickname statistics collection method such that the system statistic data would be newly collected whenever the nickname statistics is collected. The SPDA 130 of the virtual database system 100 provides mappings of the real time statistics collection method for the respective remote platforms with a pushdown analysis to collect the real time statistics across the remote platforms that are heterogeneous, in disparate system environments. The SSCA 150 of the virtual database system 100 improves the database connectivity to facilitate collection of real time statistics that was not supported in conventional database connectors.

Figure 2:
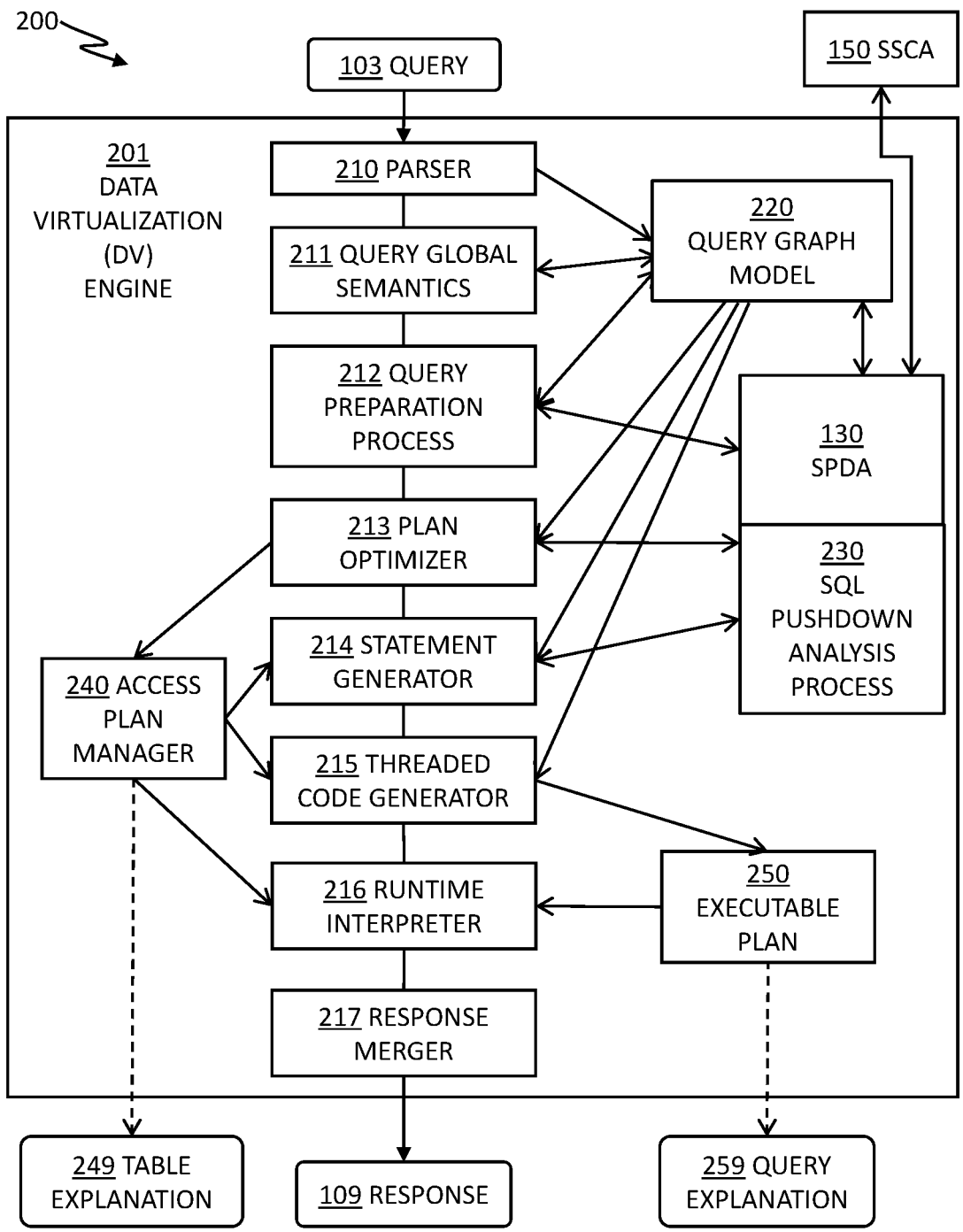
FIG. 2 depicts an overall workflow for query processing as performed by the virtual database server of FIG. 1, in accordance with one or more embodiments set forth herein.

FIG. 2 depicts an overall workflow 200 for query processing as performed by the virtual database server 120 of FIG. 1, in accordance with one or more embodiments set forth herein.

A data virtualization (DV) engine 201 represents a combination of selected components from the VDMS 110 and the SPDA 130, which improves query performance over the VDMS 110 by use of the real time statistics made available by the SPDA 130 and the SSCA 150.

The DV engine 201 includes a parser 210 compiling the query 103 as provided by the client 101. The parser 210 determines a meaning of the query 103 and represents the query 103 with a query global semantics 211 and in a query graph model 220. The query global semantics 211 represents the meaning of the query 103 independent from various representation in query operators and data object formats specific to a particular type of DBMS. Similarly, the query graph model 220 represents the query 103 with a graph describing data source objects as nodes and operations as edges. Based on representations of the query 103 in the query global semantics 211 and the query graph model 220, the DV engine 201 prepares the query 103 to rewrite for any type of DBMS amongst the data sources coupled to the virtual database server 120 that may execute the query 103 in a query preparation process 212.

The SPDA 130 enhances an SQL pushdown analysis process 230 of the VDMS 110 with real time statistics pushdown analysis in order to achieve query block translation, access plan optimization, parameter generation, etc. The SPDA 130 interacts with the SSCA 150 for collecting real time system statistics from the data sources coupled to the virtual database server 120. The DV engine 201 also provides pushdown analyses of the data source objects as enhanced by real time data source statistics, in addition to conventionally provided data source statistics by the SQL pushdown analysis process 230. The SPDA 130 in combination with the SQL pushdown analysis process 230 collect the real time system statistics, the real time data source statistics, and conventional data source statistics, and make available for the query preparation process 212, a plan optimizer 213, and a statement generator 214.

The plan optimizer 213 devises the access plan for processing the query 103 based on the statistics data collected by the SPDA 130 and the SQL pushdown analysis process 230. As noted, the access plan includes decisions on in which platform coupled to the virtual database server 120 the query 103 should be performed and which data source objects would be accessed and/or transferred. The plan optimizer 213 shares the access plan with an access plan manager 240 for execution. The statement generator 214 would generate a query statement corresponding to the query 103 for a platform set for execution, and a threaded code generator 215 generates a series of codes for the platform corresponding to the query statement, as an executable plan 250. A runtime interpreter 216 interprets the codes in the executable plan 250 as being controlled by the access plan manager 240, which generate parts of the response 109 corresponding to the section of the codes in the executable plan 250. A response merger 217 coordinates results generated from the runtime interpreter 216 executing the executable plan 250 and produces the response 109 in accordance with system parameters and available resources.

By using a system procedure of the VDMS 110, the access plan manager 240 may offer a table explanation 249 indicating certain depiction or description on formats of the data source objects in the query statement or table formats in the response 109. Another system procedure may offer a query explanation 259 with an input of the executable plan 250.

Figure 3:
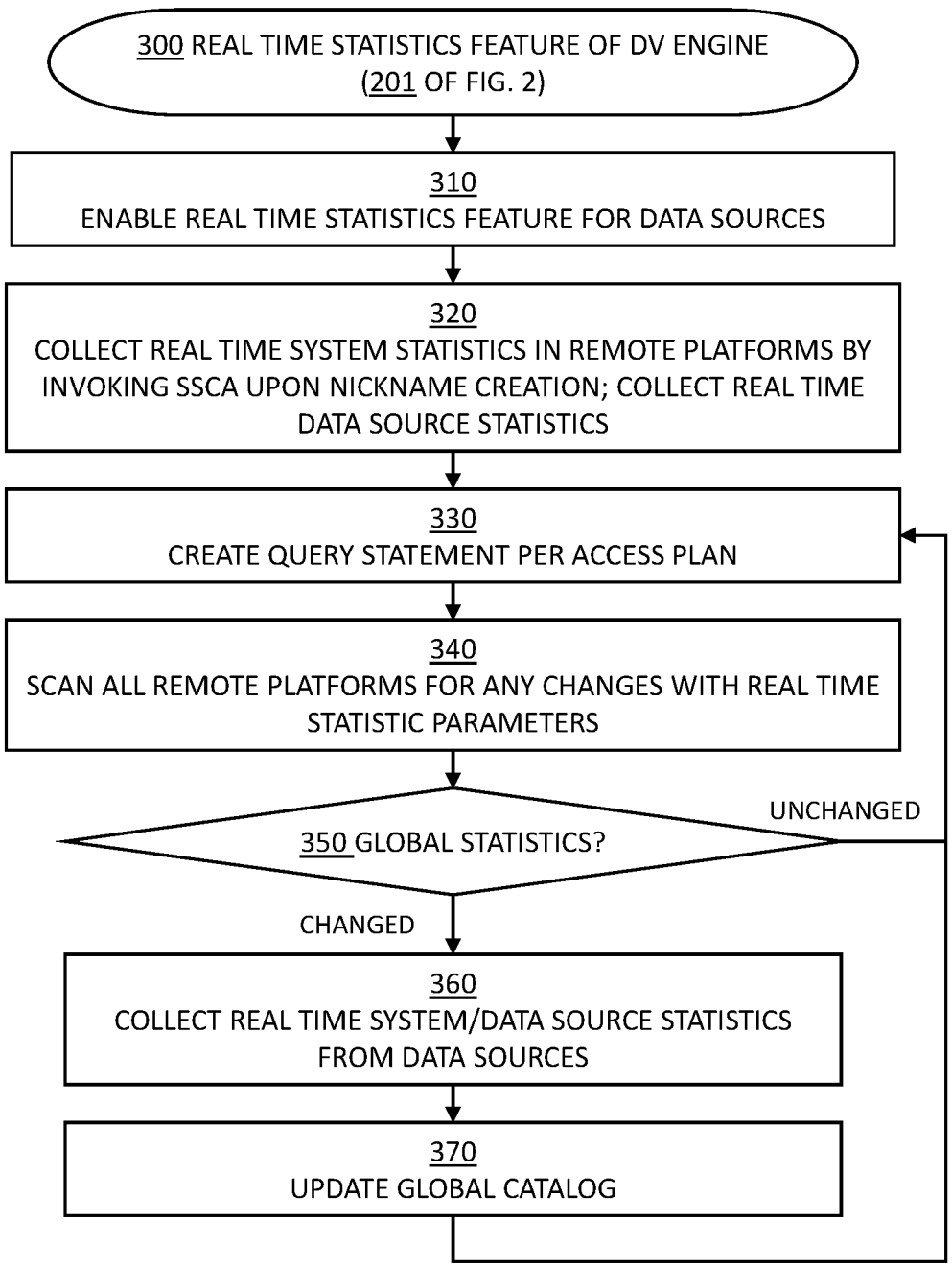
FIG. 3 depicts a real time statistics workflow as performed by the DV engine of FIG. 2, in accordance with one or more embodiments set forth herein.

FIG. 3 depicts a workflow 300 for real time statistics feature as performed by the DV engine 201 of FIG. 2, in accordance with one or more embodiments set forth herein.

In block 310, the DV engine 201 enables the real time statistics feature for the data sources DS_A 160, DS_B 170, and DS_C 180 coupled to the virtual database server 120. Then, the DV engine 201 proceeds with block 320.

In certain embodiments of the present invention, the DV engine 201 will obtain a system configuration file having the real time statistics option checked for an enabled state based on a predefined set of binary values indicating whether or not the real time statistics feature is operating in the data sources DS_A 160, DS_B 170, and DS_C 180 coupled to the virtual database server 120. The SPDA 130 in the virtual database server 120 and the SSCA 150 on respective platforms of the data sources DS_A 160, DS_B 170, and DS_C 180 as well as the virtual database server 120 will be activated or deactivated accordingly. For example, 'RT_Statistics=[Enabled|Disabled]' or 'RT_Statistics=[1|0]' line in the system configuration file would indicate the real time statistics feature has been enabled or disabled, respectively.

In other embodiments of the present invention, the RT_Statistics configuration value would have 4 levels, representing the real time statistics feature enabled or disabled as well as how often the real time statistics would be collected. In the same embodiments of the present invention, the DV engine is configured with 'RT_Statistics=[0|1|2|3]', where 'RT_Statistics=0' represents that the real time statistics feature is disabled, 'RT_Statistics=1' represents that the real time statistics feature is enabled with a level of weekly collection, 'RT_Statistics=2' represents that the real time statistics feature is enabled with a level of daily collection, and 'RT_Statistics=3' represents that the real time statistics feature is enabled with a level of hourly collection of parameters set for the real time statistics feature.

In other embodiments of the present invention, the RT_Statistics configuration for update can be set for each operation on nicknamed data source objects such that the DV engine 201 collects the real time statistics upon executing a query on the nicknamed data source objects, as periodic collection of real time statistics across all data sources might be unnecessary if the data source objects and the system environment have not changed since the latest collection of the real time statistics.

In block 320, the DV engine 201 collects real time system statistics of the remote platforms running the data sources DS_A 160, DS_B 170, and DS_C 180 by invoking the SSCA 150 on the respective remote platforms upon nickname creation. The DV engine 201 also collects the real time data source statistics and records the real time statistics in a global catalog of the virtual database server 120. Data flows between components of the DV engine 201 in block 320 are presented in FIG. 4 and corresponding description. Then, the DV engine 201 proceeds with block 330.

As noted earlier, the DV engine 201 registers all data source objects across the remote platforms running the data sources DS_A 160, DS_B 170, and DS_C 180 to identify the data source objects for access, which is a process referred to as a nickname creation as the identifier for the data source objects is termed as nickname in virtual databases such as db2. Upon creating nicknames and registering the data source objects, the DV engine 201 also collects conventional data source statistics on the nicknamed data source objects, which is referred to as nickname statistics.

In certain embodiments of the present invention, the DV engine 201 invokes the SSCA 150 on the remote platforms running the data sources DS_A 160, DS_B 170, and DS_C 180 for the real time system statistics when the nickname statistics is collected. In the same embodiments, the DV engine 201 has a method for collecting real time system statistics on parameters of network, remote CPU, remote memory, and remote IO, denoted as RT_Statistics1=F(Network, Remote_CPU, Remote_memory, Remote_IO), where a parameter Network indicates a cost of data transfer across network in the virtual database system 100, a parameter Remote_CPU indicates a cost of computation on a remote platform from which the SSCA 150 collects the real time system statistics, a parameter Remote_memory indicates a cost of memory on the remote platform from which the SSCA 150 collects the real time system statistics, and a parameter Remote_IO indicates a cost of input/output on the remote platform from which the SSCA 150 collects the real time system statistics.

In the same embodiments as above, the SSCA 150 triggers the DV engine 201 to invoke a method for collecting real time data source statistics on parameters of IUD_priority, Index_priority, and Rows_modified, denoted as RT_Statistics2=F(IUD_priority, Index_priority, Rows_modified), where a parameter IUD_priority is to keep track of insert, update, and delete operations (IUD) that had been performed by a remote database system on a remote platform that modify data source objects registered with the DV engine 201 with nicknames, a parameter Index_priority is to keep track of any index alteration on table data source objects in remote platforms by a remote database system regarding data source objects registered with the DV engine 201, and a parameter Rows_modified is to keep track of the number of rows in remote tables that had been modified by a remote database system regarding data source objects registered with the DV engine 201. In the same embodiments, as above, the DV engine 201 communicates with the remote platforms running the data sources DS_A 160, DS_B 170, and DS_C 180 for the real time data source statistics periodically according to a level set in the real time statistics update configuration.

In the same embodiments as above, the DV engine 201 has two classes RT_Stats and Non_RT_Stats defined to use the same method RT_Statistics2( ) interface on remote data source statistics. The DV engine 201 defines class RT_Stats for data sources that support real time statistics collection such as Oracle 19c and db2, and class Non_RT_Stats for data sources that do not support real time statistics collection such as MySQL. As noted above, respective data sources are mapped to the desired real time statistics collection by the SPDA 130, such that the DV engine 201 would access information equivalent to the parameters of the real time statistics in respective remote data sources. For example, for a remote data source that does not support real time statistics collection, as in MySQL above, the DV engine 201 sends a query such as "select*from information_schema.tables where table_name='table';" to retrieve the information for the real time data source statistics from the remote data source. Similarly, the DV engine 201 can run a command such as "runstats on table <tab_schema>.<table>[on all column];" for a db2 remote data source, use a predefined job "dbms_stats.set_global_prefs" offering real time statistics for a Oracle 19c remote data source, set timestamp option on SQL statement inquiring statistics for a SQL Server remote data source, and use a query such as "select*from pg_stats where tablename='tb1'" for a PostgreSQL remote data source.

In block 330, the DV engine 201 creates a query statement based on an access plan to optimize query performance according to information available in the global catalog, including the real time statistics collected from block 320. Then, the DV engine 201 proceeds with block 340.

Conventionally, the access plan in virtual databases is affected most by the type of table operations and volume of the records, that is, a number of rows in a table, affected by the table operations. For example, as a common query will include inner join operation and substring operation, if the number of rows in a remote table is much greater than the number of rows in a local table, then the access plan would generate a remote statement to push down the inner join operation and the substring operation to the remote table and performs the operations on a remote platform. Conversely, if the number of rows in a remote table is much less than the number of rows in a local table, then the access plan would generate a remote statement to fetch the remote table to a local platform to perform the operations on the local platform where the local table that is much greater than the remote table is located. If the number of rows in a remote table and the number of rows in a local table are substantially similar without much difference, then the access plan can decide to either perform the operations on a local platform or on a remote platform, as there is not much difference in performance either way.

In the same embodiments as noted in block 320, the DV engine 201 uses the real time system statistics collected and stored in the global catalog in devising the access plan and generating the query statement in block 330. For example, if the real time system statistics on Network parameter indicates that the network cost in the virtual database system 100 is great to the extent that bulk transfers of data source objects are not recommended, then the access plan would avoid any bulk transfer for processing the query 103. Also, if the real time system statistics on Remote_CPU parameter indicates that the cost of computation in a specific remote platform is very high, then the access plan would avoid any computation-bound operations on the specific remote platform. The real time system statistics made available from block 320 can contribute to further optimize the access plan, in cases where seemingly similar access plans based on conventional data source statistics can incur distinctly differentiated costs of processing based on the real time system statistics.

In block 340, the DV engine 201 scans local catalogs of all remote platforms for any changes with the parameters subject to real time statistics according to a real time statistics update configuration. Then, the DV engine 201 proceeds with block 350.

Upon registering data source objects from remote data sources with nicknames, the DV engine 201 collects data source statistics regarding the data source objects registered with the respective nickname and stores the data source statistics as nickname statistics in the global catalog, as a part of conventional virtual database operation. Conventionally the nickname statistics includes, for example, a server name, a schema name, column types, index names, etc. Remote platforms will not update the global catalog on the virtual database server 120 with any changes with the nickname statistics on the remote platforms. Data flows regarding the nickname statistics are presented in FIG. 4 and corresponding description.

Due to the lack of automated update on the nickname statistics with the global catalog for changes to the remote data source objects, the DV engine 201 collects real time data source statistics by use of a customary method for collecting data source statistics in real time. The real time statistics update configuration of the DV engine 201 indicates whether the real time statistics feature is enabled in the DV engine 201 and how often the real time data source statistics should be updated, as described in block 310.

In block 350, the DV engine 201 determines whether global statistic, as discovered in all local catalogs on respective remote platforms from block 340, has been changed since the latest collection. If the DV engine 201 determines that the global statistic has been changed, then the DV engine 201 proceeds with block 360. If the DV engine 201 determines that the global statistic has not been changed, then the DV engine 201 loops back to block 330 to continue with query processing based on the current data of the global catalog.

In certain embodiments of the present invention, any remote platform running the data sources DS_A 160, DS_B 170, and DS_C 180 returns any changes on nicknamed data source objects to the DV engine 201 upon inquiry. As the DV engine 201 registered the real time statistics parameters regarding IUD operations, rows modified, index priority in any of the data source objects, and system environments of network, CPU, memory, I/O specification on respective remote platforms running the data sources with respective nicknames, the DV engine 201 can check for any changes on the real time statistics via the nickname statistics collection method.

In block 360, the DV engine 201 collects the real time system statistics and the real time data sources statistics again from the data sources DS_A 160, DS_B 170, and DS_C 180, as the global statistics on nicknamed data source objects subject to real time statistics as discovered in block 350. Then, the DV engine 201 proceeds with block 370.

In the same embodiments as above in block 320, the DV engine 201 invokes the method RT_Statistics1( ), via the SPDA 130 and the SSCA 150, to collect the real time system statistics for values of respective parameters Network, CPU, Memory, and IO from the remote platforms running the data sources DS_A 160, DS_B 170, and DS_C 180. The DV engine 201 invokes the method RT_Statistics2( ) to collect real time data source statistics from the remote platforms running the data sources DS_A 160, DS_B 170, and DS_C 180, for values of respective parameters IUD_priority, Index_priority, and Rows_modified.

In block 370, the DV engine 201 updates the global catalog with the real time statistics that has been newly collected from block 360. The real time statistics in the global catalog is synchronized with the global statistics across all platforms of the virtual database system 100 after performing block 370. Accordingly, the DV engine 201 uses the global catalog to optimize the access plan and to generate query statements for the remote platforms running the data sources DS_A 160, DS_B 170, and DS_C 180. Then, the DV engine 201 loops back to block 330 to continue with query processing based on the current data of the global catalog.

Figure 4:
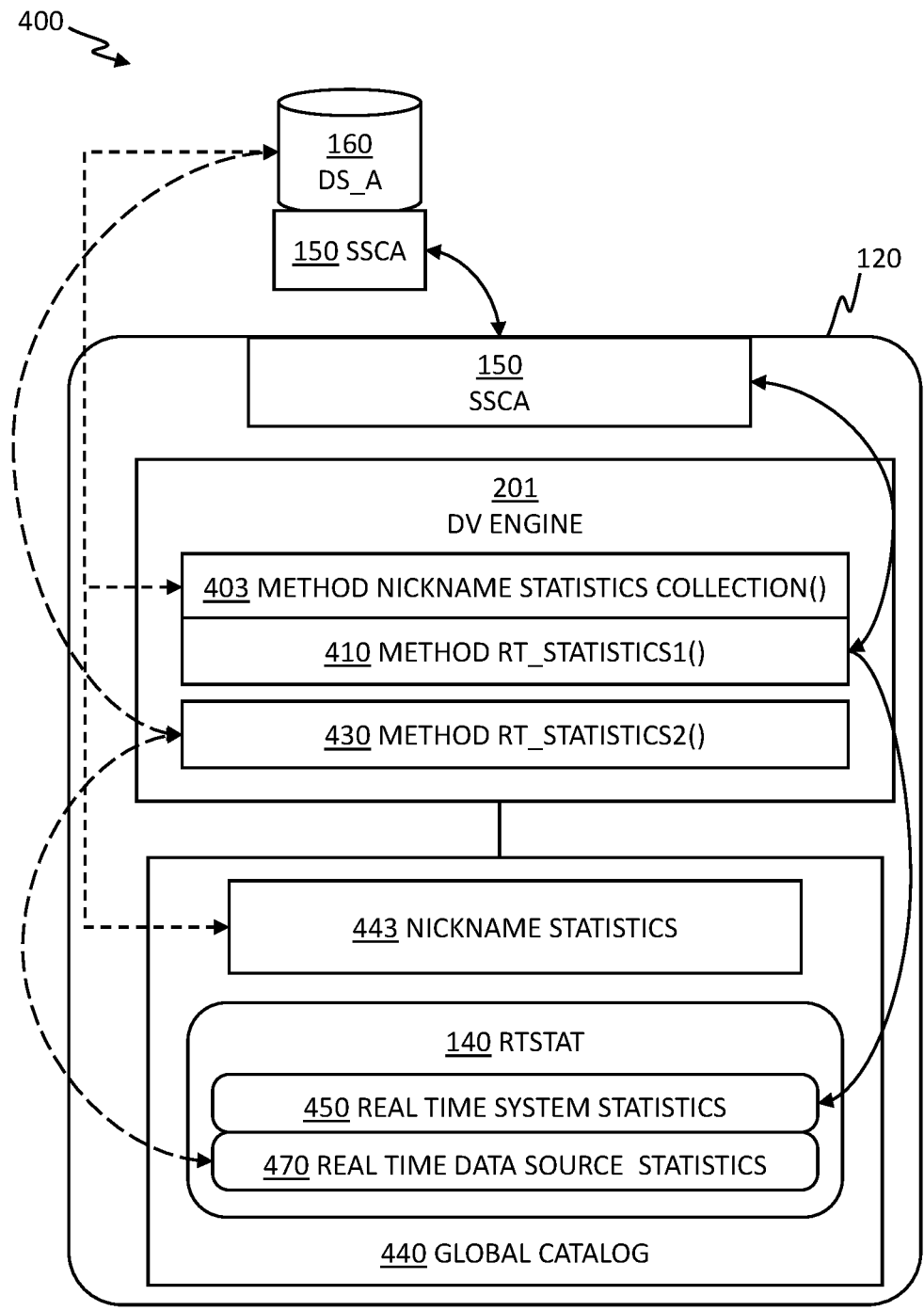
FIG. 4 depicts data flows described in the real time statistics workflow of the DV engine in FIG. 3, in accordance with one or more embodiments set forth herein.

FIG. 4 depicts data flows 400 described in the workflow 300 of the DV engine 201 in FIG. 3, in accordance with one or more embodiments set forth herein.

In the same embodiments noted in block 320 of FIG. 3, the DV engine 201 invokes a method Nickname Statistics Collection( ) 403, defined as SYSPROC.NNSTAT in db2, for example, upon registering the remote data source objects by creating nicknames.

The DV engine 201 invokes a method for collecting real time system statistics RT_Statistics1( ) 410 concurrently with the method Nickname Statistics Collection( ) 403. The method for collecting real time system statistics RT_Statistics1( ) 410 sends a command to the SSCA 150 on the virtual database server 120 to communicate with the SSCA 150 on the remote data source DS_A 160 and to collect the real time system statistics of Net_latency, Remote_CPU, Remote_memory, and Remote_IO from the remote data source DS_A 160, and the SSCA 150 on the remote data source DS_A 160 collects the real time system statistics of Net_latency, Remote_CPU, Remote_memory, and Remote_IO and returns to the DV engine 201, as indicated with bidirectional solid links. The method RT_Statistics1( ) 410 stores real time system statistics 450 of Net_latency, Remote_CPU, Remote_memory, and Remote_IO from the remote data source DS_A 160 in the real time statistics table (RTSTAT) 140 in a global catalog 440, as indicated with a solid link to the real time system statistics 450 in the global catalog 440.

The DV engine 201 stores nickname statistics 443 including conventional remote data source statistics in the global catalog 440.

As noted above in FIG. 3, upon registering data source objects from remote data sources with nicknames, the DV engine 201 collects data source statistics regarding the data source objects registered with the respective nickname by invoking a method Nickname statistics collection( ) 403 and stores the data source statistics as nickname statistics 443 in the global catalog 440, indicated by short-dashed connections amongst the data source DS_A 160, the method Nickname statistics collection( ) 403, and the nickname statistics 443 in the global catalog 440. The DV engine 201 uses conventional database connector interface in communicating with the data source DS_A 160 without going through the SSCA 150.

As noted in block 320, the DV engine 201 triggered by the SSCA 150 invokes a method RT_Statistics2( ) 430 for collecting real time data source statistics on parameters of IUD_priority, Index_priority, and Rows_modified, as described in block 320 of FIG. 3. In the same embodiments as above, the DV engine 201 collects real time data source statistics by communicating with the remote platform running the data source DS_A 160 periodically at an interval according to a level set in the real time statistics update configuration. The DV engine 201 subsequently stores real time data source statistics 470 in the global catalog 440, as indicated by long-dashed links amongst the data source DS_A 160, the method RT_Statistics2( ) 430, and the real time data source statistics 470 in the global catalog 440.

The DV engine 201 invokes a method for collecting real time system statistics RT_Statistics1( ) 410 concurrently with the method Nickname Statistics Collection( ) 403. The method for collecting real time system statistics RT_Statistics1( ) 410 sends a command to the SSCA 150 on the virtual database server 120 to communicate with the SSCA 150 on the remote data source DS_A 160 and to collect the real time system statistics of Net_latency, Remote_CPU, Remote_memory, and Remote_IO from the remote data source DS_A 160, and the SSCA 150 on the remote data source DS_A 160 collects the real time system statistics of Net_latency, Remote_CPU, Remote_memory, and Remote_IO and returns to the DV engine 201, as indicated with bidirectional solid links. The method RT_Statistics1( ) 410 stores real time system statistics 450 of Net_latency, Remote_CPU, Remote_memory, and Remote_IO from the remote data source DS_A 160 in the real time statistics table (RTSTAT) 140 in a global catalog 440, as indicated with a solid link to the real time system statistics 450 in the global catalog 440. The DV engine 201 stores nickname statistics 443 including conventional remote data source statistics in the global catalog 440.

Certain embodiments of the present invention improve query performance in virtual database by providing a range of statistics information including, but not limited to, real time system statistics of network connectivity across all data sources, processing, memory and I/O capacities on respective remote platforms running the data sources. Certain embodiments of the present invention provide real time global statistics collection methods and interfaces amongst heterogeneous remote data sources. Certain embodiments of the present invention improve preexisting database connectors with real time statistics collection function that is initiated by existing data source statistics mechanism. Certain embodiments of the present invention provide mappings of the real time statistics collection method for the respective remote platforms per respective support on statistics collection. Certain embodiments of the present invention improve a query pushdown analysis with statistics pushdown as being mapped for the respective remote platforms in the virtual database. Certain embodiments of the present invention improve database connectors with real time statistics collection method. Certain embodiments of the present invention for the virtual database can be implemented by use of a cloud platform/data center/server farm in various types including a Software-as-a-Service (SaaS), Platform-as-a-Service (PaaS), Database-as-a-Service (DBaaS), and combinations thereof. The virtual database system can be offered for and delivered to any service providers/business entities/vendors of software applications from any location in the world in need of data virtualization with optimal query performance based on real time statistics across the virtual database.

Embodiments of the present invention present a computer implemented method including, for instance: collecting, by one or more processor, real time system statistics on a system environment in a remote platform running a remote data source amongst a plurality of remote data sources of a virtual database, where the remote data sources of the virtual database are heterogeneous database management systems run on respective remote platforms across disparate geographical locations; gathering, by the one or more processor, real time data source statistics on one or more data source objects from the remote data source of the virtual database; updating, by the one or more processor, a global catalog of the virtual database with the real time system statistics from the collecting and the real time data source statistics from the gathering; optimizing, by the one or more processor, an access plan to process a query submitted to the virtual database from a client application based on the real time system statistics and the real time data source statistics in the global catalog; and producing, by the one or more processor, a response corresponding to the query by executing the access plan to thereby improve both a response time of the query and a cost of processing.

Embodiments of the present invention present a computer implemented method also including, for instance: the collecting including: fetching, upon registering one or more data source objects from the remote data source of the virtual database for use, the real time system statistics on the system environment of the remote data source of the virtual database, on parameters regarding network capacity, processing capacity, memory capacity, and input/output capacity of the remote platform running the remote data source.

Embodiments of the present invention present a computer implemented method also including, for instance: the gathering including: fetching, by use of a real time data source statistics collection method mapped for the remote data source, the real time data source statistics on the one or more data source objects from the remote data source that are registered with the virtual database, on parameters regarding priorities for insert-update-delete operations, index priority, and modified rows on the one or more data source objects from the remote data source of the virtual database that have been registered with the virtual database.

Embodiments of the present invention present a computer implemented method also including, for instance: ascertaining, prior to the collecting, that the real time system statistics and the real time data source statistics stored in the global catalog of the virtual database has been changed since a latest iteration of the collecting, regarding the one or more data source objects registered with the virtual database; where the collecting including: fetching the real time system statistics on the system environment of the remote data source of the virtual database, on system parameters regarding network capacity, processing capacity, memory capacity, and input/output capacity of the remote platform running the remote data source; and where the gathering including: fetching, by use of a real time data source statistics collection method mapped for the remote data source, the real time data source statistics on the one or more data source objects from the remote data source that are registered with the virtual database, on data source parameters regarding priorities for insert-update-delete operations, index priority, and modified rows on the one or more data source objects from the remote data source of the virtual database that have been registered with the virtual database.

Embodiments of the present invention present a computer implemented method also including, for instance: the collecting including: fetching the real time system statistics on the system environment of the remote data source of the virtual database, on parameters regarding network capacity, processing capacity, memory capacity, and input/output capacity of the remote platform running the remote data source, by use of a real time system statistics collection method mapped for the remote platform, including: sending, by a system statistics collection agent running on a server of the virtual database, the real time system statistics collection method mapped for the remote platform to a system statistics collection agent running on the remote platform that forms a direct interface to communicate system statistics information without going through a database connector in the server of the virtual database and one of the database management systems running on the remote platform; and receiving, by the system statistics collection agent running on the server of the virtual database, values respective to the parameters of the real time system statistics collection method from another system statistics collection agent running on the remote platform through the direct interface.

Embodiments of the present invention present a computer implemented method also including, for instance: the collecting including: fetching the real time system statistics on the system environment of the remote data source of the virtual database, on parameters regarding network capacity, processing capacity, memory capacity, and input/output capacity of the remote platform running the remote data source, by use of a real time system statistics collection method mapped for the remote platform, including: sending, by a system statistics collection agent running on a server of the virtual database, the real time system statistics collection method mapped for the remote platform to another system statistics collection agent running on the remote platform that forms a direct interface to communicate system statistics information without going through a database connector in the server of the virtual database and one of the database management systems running on the remote platform; and receiving, by the system statistics collection agent running on the server of the virtual database, values respective to the parameters of the real time system statistics collection method from another system statistics collection agent running on the remote platform through the direct interface; and ascertaining, prior to the gathering the real time data source statistics, that the system statistics collection agent running on the server of the virtual database activated the server of the virtual database to execute a real time data source statistics collection method.

Embodiments of the present invention present a computer implemented method also including, for instance: mapping, prior to the gathering, a real time data source statistics collection method on parameters regarding priorities for insert-update-delete operations, index priority, and modified rows on the one or more data source objects to a routine that can retrieve the parameters of the real time data source statistics collection method from the remote data source, regardless of real time statistics support on the remote data source.

Figure 5:
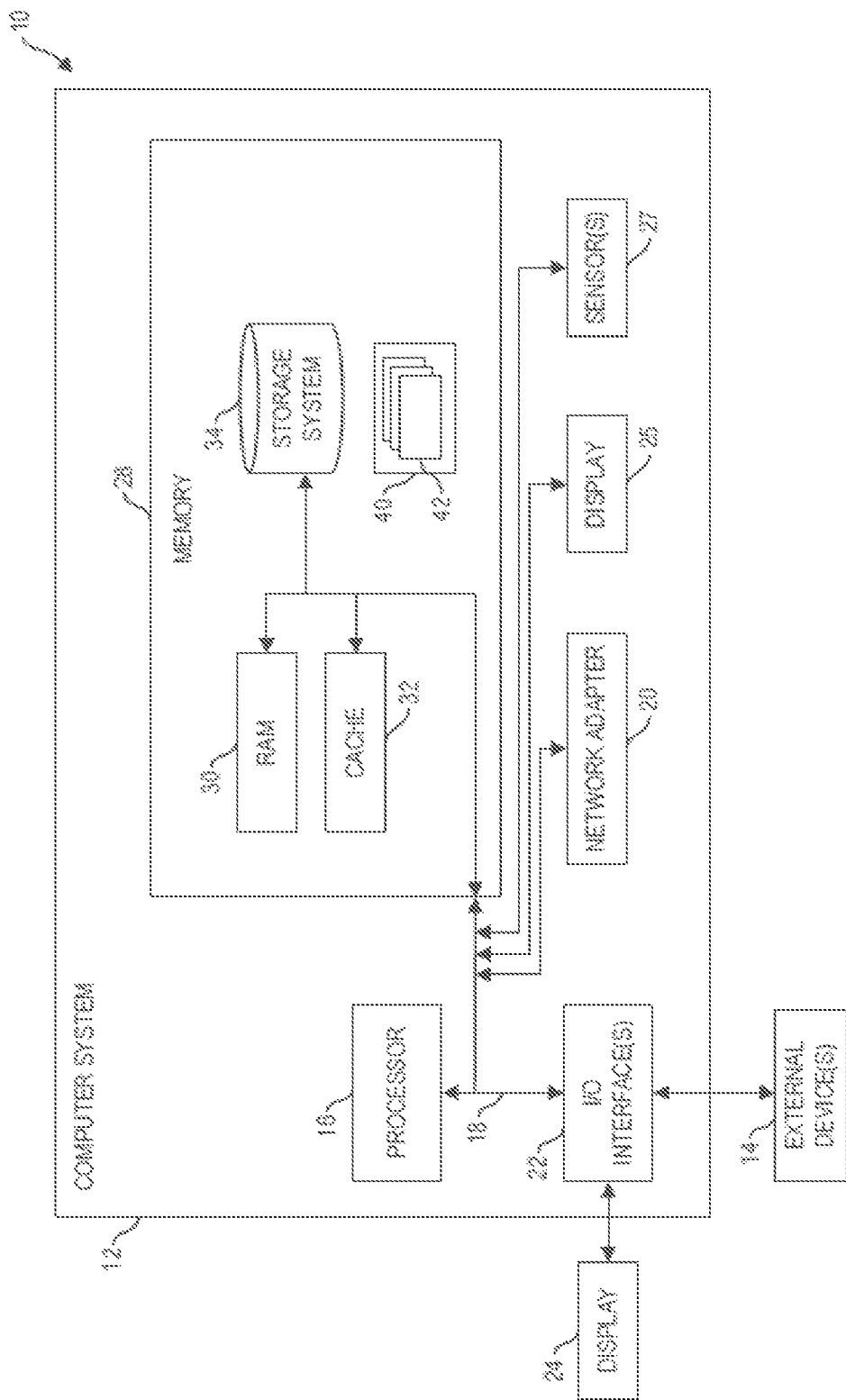
FIG. 5 depicts a cloud computing node according to an embodiment of the present invention.
Figure 6:
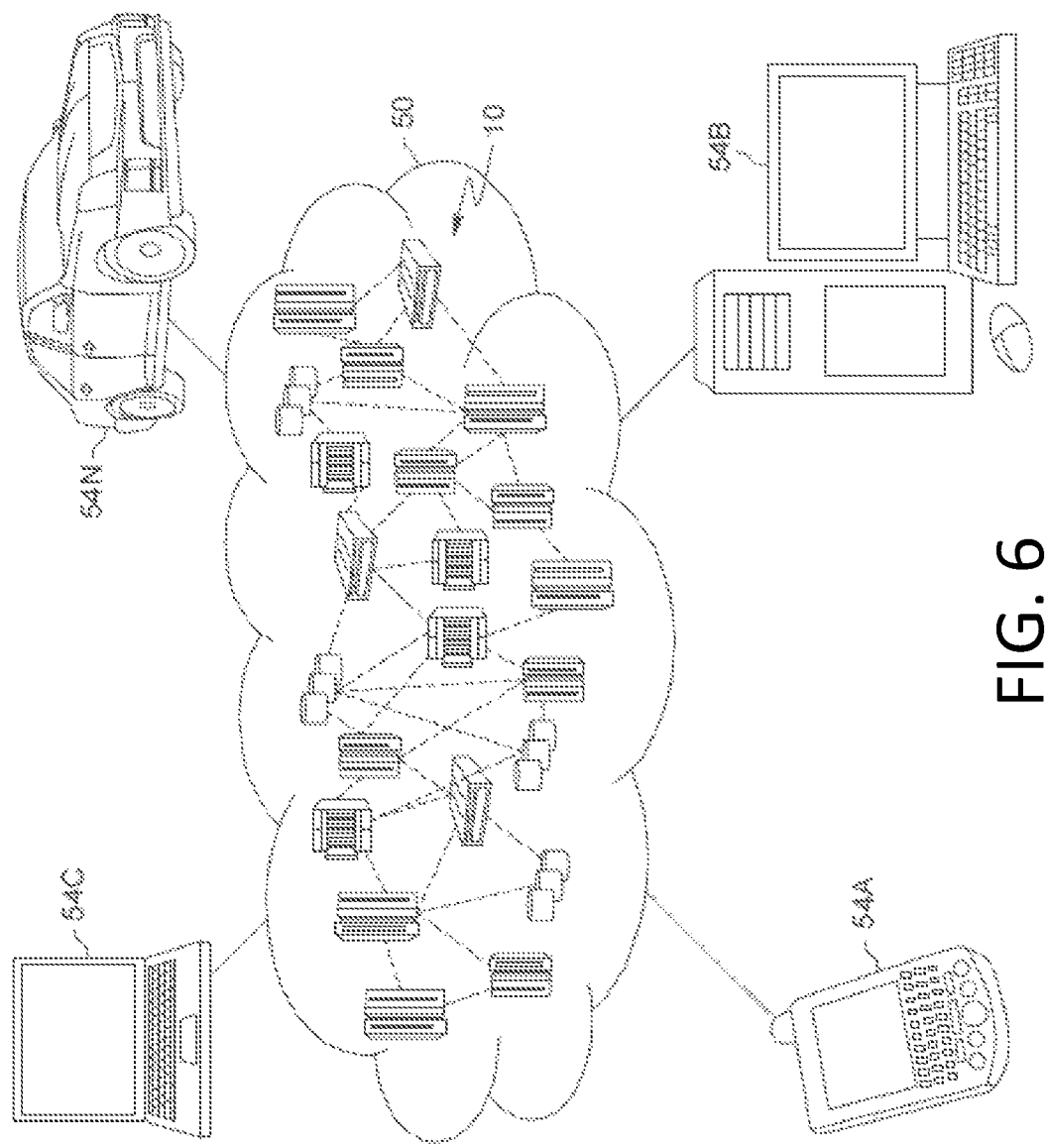
FIG. 6 depicts a cloud computing environment according to an embodiment of the present invention.
Figure 7:
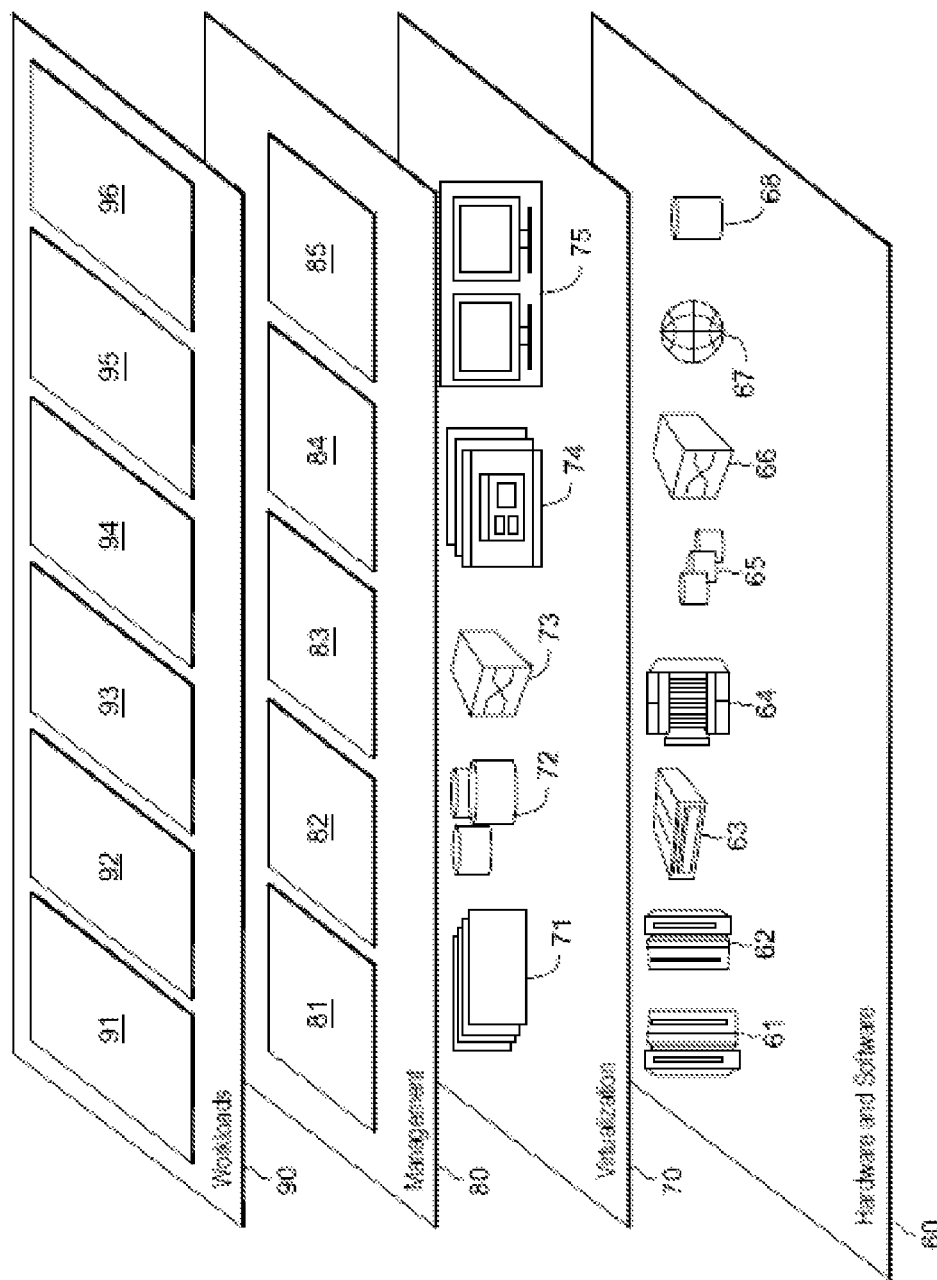
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the SPDA 130, the SSCA 150 of FIG. 1, and the DV engine 201 of FIG. 2. Program processes 42, as in the SPDA 130, the SSCA 150, and the DV engine 201, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 6, illustrative cloud computing environment 50 is depicted. As shown, cloud computing environment 50 includes one or more cloud computing nodes 10 running the database decomposition system 120 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for various processes in the virtual database system, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   collecting, by one or more processor, real time system statistics on a system environment in a remote platform running a remote data source amongst a plurality of remote data sources of a virtual database, wherein the remote data sources of the virtual database are heterogeneous database management systems run on respective remote platforms across disparate geographical locations;
   gathering, by the one or more processor, real time data source statistics on one or more data source objects from the remote data source of the virtual database;
   updating, by the one or more processor, a global catalog of the virtual database with the real time system statistics from the collecting and the real time data source statistics from the gathering;
   optimizing, by the one or more processor, an access plan to process a query submitted to the virtual database from a client application based on the real time system statistics and the real time data source statistics in the global catalog; and
   producing, by the one or more processor, a response corresponding to the query by executing the access plan to thereby improve both a response time of the query and a cost of processing.

2. The computer implemented method of claim 1, the collecting comprising:
   fetching, upon registering one or more data source objects from the remote data source of the virtual database for use, the real time system statistics on the system environment of the remote data source of the virtual database, on parameters regarding network capacity, processing capacity, memory capacity, and input/output capacity of the remote platform running the remote data source.

3. The computer implemented method of claim 1, the gathering comprising:
   fetching, by use of a real time data source statistics collection method mapped for the remote data source, the real time data source statistics on the one or more data source objects from the remote data source that are registered with the virtual database, on parameters regarding priorities for insert-update-delete operations, index priority, and modified rows on the one or more data source objects from the remote data source of the virtual database that have been registered with the virtual database.

4. The computer implemented method of claim 1, further comprising:
   ascertaining, prior to the collecting, that the real time system statistics and the real time data source statistics stored in the global catalog of the virtual database have been changed since a latest iteration of the collecting, regarding the one or more data source objects registered with the virtual database;
   wherein the collecting comprising:
      fetching the real time system statistics on the system environment of the remote data source of the virtual database, on system parameters regarding network capacity, processing capacity, memory capacity, and input/output capacity of the remote platform running the remote data source; and wherein the gathering comprising:

fetching, by use of a real time data source statistics collection method mapped for the remote data source, the real time data source statistics on the one or more data source objects from the remote data source that are registered with the virtual database, on data source parameters regarding priorities for insert-update-delete operations, index priority, and modified rows on the one or more data source objects from the remote data source of the virtual database that have been registered with the virtual database.

5. The computer implemented method of claim 1, the collecting comprising:

fetching the real time system statistics on the system environment of the remote data source of the virtual database, on parameters regarding network capacity, processing capacity, memory capacity, and input/output capacity of the remote platform running the remote data source, by use of a real time system statistics collection method mapped for the remote platform, comprising:

sending, by a system statistics collection agent running on a server of the virtual database, the real time system statistics collection method mapped for the remote platform to a system statistics collection agent running on the remote platform that forms a direct interface to communicate system statistics information without going through a database connector in the server of the virtual database and one of the database management systems running on the remote platform; and receiving, by the system statistics collection agent running on the server of the virtual database, values respective to the parameters of the real time system statistics collection method from another system statistics collection agent running on the remote platform through the direct interface.

6. The computer implemented method of claim 1, the collecting comprising:

fetching the real time system statistics on the system environment of the remote data source of the virtual database, on parameters regarding network capacity, processing capacity, memory capacity, and input/output capacity of the remote platform running the remote data source, by use of a real time system statistics collection method mapped for the remote platform, comprising:

sending, by a system statistics collection agent running on a server of the virtual database, the real time system statistics collection method mapped for the remote platform to another system statistics collection agent running on the remote platform that forms a direct interface to communicate system statistics information without going through a database connector in the server of the virtual database and one of the database management systems running on the remote platform; and receiving, by the system statistics collection agent running on the server of the virtual database, values respective to the parameters of the real time system statistics collection method from another system statistics collection agent running on the remote platform through the direct interface; and ascertaining, prior to the gathering the real time data source statistics, that the system statistics collection agent running on the server of the virtual database activated the server of the virtual database to execute a real time data source statistics collection method.

7. The computer implemented method of claim 1, further comprising:

mapping, prior to the gathering, a real time data source statistics collection method on parameters regarding priorities for insert-update-delete operations, index priority, and modified rows on the one or more data source objects to a routine that can retrieve the parameters of the real time data source statistics collection method from the remote data source, regardless of real time statistics support on the remote data source.

8. The computer implemented method of claim 1, further comprising:

ascertaining, prior to the collecting, that the real time system statistics and the real time data source statistics stored in the global catalog of the virtual database have been changed since a latest iteration of the collecting, regarding the one or more data source objects registered with the virtual database.

9. The computer implemented method of claim 1, further comprising:

ascertaining, prior to the collecting, that the real time system statistics stored in the global catalog of the virtual database have been changed since a latest iteration of the collecting.

10. The computer implemented method of claim 1, further comprising:

performing the collecting in dependence on a determining that the real time system statistics stored in the global catalog of the virtual database have been changed since a latest iteration of the collecting.

11. The computer implemented method of claim 1, the collecting comprising:

fetching, upon registering one or more data source objects from the remote data source of the virtual database for use, the real time system statistics on the system environment of the remote data source of the virtual database, on parameters regarding one or more of the following selected from the group consisting of network capacity, processing capacity, memory capacity, and input/output capacity of the remote platform running the remote data source.

12. The computer implemented method of claim 1, the collecting comprising:

fetching, upon registering one or more data source objects from the remote data source of the virtual database for use, the real time system statistics on the system environment of the remote data source of the virtual database, on parameters regarding computing resource capacity of the remote platform running the remote data source.

13. A computer program product comprising: a computer readable storage medium readable by one or more processors and storing instructions for execution by the one or more processors for performing a method comprising:

collecting real time system statistics on a system environment in a remote platform running a remote data source amongst a plurality of remote data sources of a virtual database, wherein the remote data sources of the virtual database are heterogeneous database management systems run on respective remote platforms across disparate geographical locations;

gathering real time data source statistics on one or more data source objects from the remote data source of the virtual database;

updating a global catalog of the virtual database with the real time system statistics from the collecting and the real time data source statistics from the gathering;

optimizing an access plan to process a query submitted to the virtual database from a client application based on the real time system statistics and the real time data source statistics in the global catalog; and producing a response corresponding to the query by executing the access plan to thereby improve both a response time of the query and a cost of processing.

14. A system comprising:

a memory;

one or more processors in communication with the memory; and program instructions executable by the one or more processors via the memory to perform a method comprising:

collecting real time system statistics on a system environment in a remote platform running a remote data source amongst a plurality of remote data sources of a virtual database, wherein the remote data sources of the virtual database are heterogeneous database management systems run on respective remote platforms across disparate geographical locations;

gathering real time data source statistics on one or more data source objects from the remote data source of the virtual database;

updating a global catalog of the virtual database with the real time system statistics from the collecting and the real time data source statistics from the gathering;

optimizing an access plan to process a query submitted to the virtual database from a client application based on the real time system statistics and the real time data source statistics in the global catalog; and producing a response corresponding to the query by executing the access plan to thereby improve both a response time of the query and a cost of processing.

15. The system of claim 14, the collecting comprising:

fetching, upon registering one or more data source objects from the remote data source of the virtual database for use, the real time system statistics on the system environment of the remote data source of the virtual database, on parameters regarding network capacity, processing capacity, memory capacity, and input/output capacity of the remote platform running the remote data source.

16. The system of claim 14, the gathering comprising:

fetching, by use of a real time data source statistics collection method mapped for the remote data source, the real time data source statistics on the one or more data source objects from the remote data source that are registered with the virtual database, on parameters regarding priorities for insert-update-delete operations, index priority, and modified rows on the one or more data source objects from the remote data source of the virtual database that have been registered with the virtual database.

17. The system of claim 14, further comprising:

ascertaining, prior to the collecting, that the real time system statistics and the real time data source statistics stored in the global catalog of the virtual database has been changed since a latest iteration of the collecting, regarding the one or more data source objects registered with the virtual database;

wherein the collecting comprising:

fetching the real time system statistics on the system environment of the remote data source of the virtual database, on system parameters regarding network capacity, processing capacity, memory capacity, and input/output capacity of the remote platform running the remote data source; and wherein the gathering comprising:

fetching, by use of a real time data source statistics collection method mapped for the remote data source, the real time data source statistics on the one or more data source objects from the remote data source that are registered with the virtual database, on data source parameters regarding priorities for insert-update-delete operations, index priority, and modified rows on the one or more data source objects from the remote data source of the virtual database that have been registered with the virtual database.

18. The system of claim 14, the collecting comprising:

fetching the real time system statistics on the system environment of the remote data source of the virtual database, on parameters regarding network capacity, processing capacity, memory capacity, and input/output capacity of the remote platform running the remote data source, by use of a real time system statistics collection method mapped for the remote platform, comprising:

sending, by a system statistics collection agent running on a server of the virtual database, the real time system statistics collection method mapped for the remote platform to a system statistics collection agent running on the remote platform that forms a direct interface to communicate system statistics information without going through a database connector in the server of the virtual database and one of the database management systems running on the remote platform; and receiving, by the system statistics collection agent running on the server of the virtual database, values respective to the parameters of the real time system statistics collection method from another system statistics collection agent running on the remote platform through the direct interface.

19. The system of claim 14, further comprising:

ascertaining, prior to the collecting, that the real time data source statistics stored in the global catalog of the virtual database have been changed since a latest iteration of the collecting.

20. The system of claim 14, further comprising:

performing the collecting in dependence on a determining that the real time data source statistics stored in the global catalog of the virtual database have been changed since a latest iteration of the collecting.

\* \* \* \* \*